US008571914B2

(12) United States Patent
Breiter et al.

(10) Patent No.: US 8,571,914 B2
(45) Date of Patent: Oct. 29, 2013

(54) EXECUTING A BUSINESS PROCESS BY A STANDARD BUSINESS PROCESS ENGINE

(75) Inventors: Gerd Breiter, Boeblingen (DE); Matthias Kloppmann, Boeblingen (DE); Thomas Spatzier, Boeblingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/554,358

(22) Filed: Jul. 20, 2012

(65) Prior Publication Data

US 2012/0290346 A1 Nov. 15, 2012

Related U.S. Application Data

(63) Continuation of application No. 13/444,293, filed on Apr. 11, 2012.

(30) Foreign Application Priority Data

Apr. 12, 2011 (EP) .................................... 11162046

(51) Int. Cl.
*G06Q 10/00* (2012.01)
(52) U.S. Cl.
USPC ........ 705/7.23; 705/7.27; 705/7.11; 709/223; 717/101
(58) Field of Classification Search
None
See application file for complete search history.

(56) References Cited

U.S. PATENT DOCUMENTS

| 5,734,837 | A | 3/1998 | Flores et al. | |
|---|---|---|---|---|
| 6,817,008 | B2 | 11/2004 | Ledford et al. | |
| 7,003,560 | B1* | 2/2006 | Mullen et al. | 709/223 |
| 7,467,371 | B1 | 12/2008 | Meredith et al. | |
| 7,631,291 | B2 | 12/2009 | Shukla et al. | |
| 7,840,896 | B2* | 11/2010 | Tien et al. | 715/243 |
| 2001/0044738 | A1* | 11/2001 | Elkin et al. | 705/8 |
| 2002/0065701 | A1* | 5/2002 | Kim et al. | 705/9 |
| 2002/0143595 | A1* | 10/2002 | Frank et al. | 705/8 |
| 2002/0173997 | A1* | 11/2002 | Menard et al. | 705/7 |
| 2004/0024622 | A1* | 2/2004 | Knight | 705/7 |
| 2004/0039619 | A1* | 2/2004 | Zarb | 705/7 |
| 2004/0162844 | A1* | 8/2004 | Thome et al. | 707/102 |

(Continued)

OTHER PUBLICATIONS

Hanai et al, An Integrated Software Maintenance Environment Bridging Configuration Management and Quality Management, IEEE Computer society press, Oct. 24, 1988, pp. 40-44.*

(Continued)

*Primary Examiner* — Gurkanwaljit Singh
(74) *Attorney, Agent, or Firm* — Cuenot, Forsythe & Kim, LLC

(57) ABSTRACT

Executing a business process can include providing a context data object including a payload data structure for storing a payload data and automatically splitting an annotated context data object into one or more utility data objects. Responsive to creating a second utility data object, a pre-processing task can be injected into the business process, the pre-processing task using a copy of a first mapping to read data from the pre-defined data structure instance and to store the read data as payload data in the payload data structure of the first utility data object. Responsive to creating a third utility object, a post-processing task can be injected into the business process. The post-processing task can use a copy of the second mapping to write the payload data of the first utility data object to elements of a predefined data structure instance.

15 Claims, 3 Drawing Sheets

(56) References Cited

U.S. PATENT DOCUMENTS

| | | | |
|---|---|---|---|
| 2004/0260590 A1* | 12/2004 | Golani et al. | 705/8 |
| 2005/0071209 A1 | 3/2005 | Tatavu et al. | |
| 2006/0184410 A1* | 8/2006 | Ramamurthy et al. | 705/8 |
| 2007/0021992 A1* | 1/2007 | Konakalla | 705/7 |
| 2007/0150330 A1* | 6/2007 | McGoveran | 705/8 |
| 2007/0208765 A1* | 9/2007 | Li et al. | 707/101 |
| 2007/0226678 A1* | 9/2007 | Li et al. | 717/101 |
| 2007/0244892 A1* | 10/2007 | Narancic | 707/7 |
| 2007/0250377 A1* | 10/2007 | Hill et al. | 705/11 |
| 2007/0265900 A1 | 11/2007 | Moore | |
| 2008/0312979 A1* | 12/2008 | Lee et al. | 705/7 |
| 2008/0312980 A1* | 12/2008 | Boulineau et al. | 705/7 |
| 2008/0313008 A1* | 12/2008 | Lee et al. | 705/10 |
| 2008/0313110 A1* | 12/2008 | Kreamer et al. | 706/12 |
| 2008/0313595 A1* | 12/2008 | Boulineau et al. | 717/101 |
| 2008/0313596 A1* | 12/2008 | Kreamer et al. | 717/101 |
| 2010/0083212 A1 | 4/2010 | Fritzsche et al. | |

OTHER PUBLICATIONS

Hugh W. Ryan, Scott R. Sargent, Tomothy M. Boudreau, Yannie S. Arvanitis, Stanton J. Taylor, and Craig Mindrum, "Practical Guide to Client Server Computing," Second Edition, 1998.*

Hugh W. Ryan, Michael W. Alber, Stanton J. Taylor, Richard A. Chang, Yannis S. Arvanitis, Michael C. Davis, Nancy K. Mullen, Shari L. Dove, Prem N. Mehra, and Craig Mindrum, "Netcentric Computing: Computing, Communications, and Knowledge," 1998.*

J. Smeets and S. Boyer, "Internet and Client Server Patent Information Systems: New Services From Derwent," Commercially Developed Systems/World Patent Information, 20, pp. 136-139 (1998).*

Calame, Paul et al., "Cockpit: Decision Support Tool for Factory Operations and Supply Chain Management", Intel Technology Journal Q1, 2000 Intel Corporation, http://developer.intel.com/technology/itj/q12000/pdf.cockpit.pdf, pp. 1-13.*

Callen, Daniel J. et al., "Consolidation of Query Results in a Multidatabase Environment: An Object Oriented Approach" IEEE, 1996.*

Mulins, Craig S., "Distributed Query Optimization Technical Support", Jul. 1996.*

Chihping Wang; Ming-Syan Chen, "On the complexity of distributed query optimization," Knowledge and Data Engineering, IEEE Transactions on , vol. 8, No. 4, pp. 650,662, Aug. 1996.*

* cited by examiner

EXECUTING A BUSINESS PROCESS BY A STANDARD BUSINESS PROCESS ENGINE

CROSS-REFERENCE TO RELATED APPLICATIONS

This application is a Continuation of U.S. application Ser. No. 13/444,293, filed on Apr. 11, 2012, which claims the benefit of European Patent Application Number 11162046.4 filed on Apr. 12, 2011, the entirety of which is incorporated herein by reference.

BACKGROUND

A common task in software engineering is the representation of processes of an enterprise, i.e., production processes or business processes in a process model. The task of business process modelling (BPM) is typically performed by business process engineers who are familiar with the business processes of an enterprise and are trained in improving process efficiency. A 'process' is a chain of events in an enterprise, e.g., from purchase to supply or from manufacture to sales. Such events can also be services provided by individual system components, also referred to as 'resources'.

A common problem when using such a service in a business process is that said predefined data structures are often proprietary and/or have been developed for the particular requirements of said service. Instances of said data structures acting as I/O interfaces of said services can therefore often not be processed by a standard business process engine.

One solution to this problem is solely using a proprietary process language and a corresponding runtime environment. This approach, however, limits the number of environments in which a service can be hosted and limits the portability of service descriptions. Another approach is to encode the details of the data exchange between the executed business process and a service within the business process plan. This is, however, problematic, if a once specified business process plan needs to be ported to another technical platform, as a business process engineer is typically familiar with only a limited number of technical platforms acting as runtime environments for said services.

BRIEF SUMMARY

An embodiment can include a method of executing a business process by a standard business process engine. The method can include providing a context data object annotated with mapping information, the context data object including a payload data structure for storing a payload data, and automatically splitting the annotated context data object using a processor into one or more utility data objects, each utility data object conforming to a standard data object definition. The one or more utility data objects can include a first utility data object including the payload data structure, a second utility data object when the context data object is annotated with a first mapping, wherein the second utility data object includes a copy of the first mapping, and a third utility data object when the context data object is annotated with a second mapping, wherein the third utility data object includes a copy of the second mapping. Responsive to creating the second utility data object, a pre-processing task can be injected into a business process, wherein pre-processing task uses the copy of the first mapping to read data from the predefined data structure instance and to store the read data as payload data in the payload data structure of the first utility data object. Responsive to creating the third utility object, a post-processing task can be injected into the business process. The post-processing task can use the copy of the second mapping to write the payload data of the first utility data object to elements of a predefined data structure instance.

Another embodiment can include a system. The system can include a processor configured to initiate executable operations of a business process using a standard business process engine. The operations can include providing a context data object annotated with mapping information, the context data object including a payload data structure for storing a payload data, and automatically splitting the annotated context data object into one or more utility data objects, each utility data object conforming to a standard data object definition. The one or more utility data objects can include a first utility data object including the payload data structure, a second utility data object when the context data object is annotated with a first mapping, wherein the second utility data object includes a copy of the first mapping, and a third utility data object when the context data object is annotated with a second mapping, wherein the third utility data object includes a copy of the second mapping. Responsive to creating the second utility data object, a pre-processing task can be injected into a business process, wherein pre-processing task uses the copy of the first mapping to read data from the predefined data structure instance and to store the read data as payload data in the payload data structure of the first utility data object. Responsive to creating the third utility object, a post-processing task can be injected into the business process. The post-processing task can use the copy of the second mapping to write the payload data of the first utility data object to elements of a predefined data structure instance.

Another embodiment can include a computer program product for executing a business process by a standard business process engine. The computer program product can include a computer readable storage medium having stored thereon program code that, when executed, configures a processor to perform executable operations. The executable operations can include providing a context data object annotated with mapping information, the context data object including a payload data structure for storing a payload data, and automatically splitting the annotated context data object into one or more utility data objects, each utility data object conforming to a standard data object definition. The one or more utility data objects can include a first utility data object including the payload data structure, a second utility data object when the context data object is annotated with a first mapping, wherein the second utility data object includes a copy of the first mapping, and a third utility data object when the context data object is annotated with a second mapping, wherein the third utility data object includes a copy of the second mapping. Responsive to creating the second utility data object, a pre-processing task can be injected into a business process, wherein pre-processing task uses the copy of the first mapping to read data from the predefined data structure instance and to store the read data as payload data in the payload data structure of the first utility data object. Responsive to creating the third utility object, a post-processing task can be injected into the business process. The post-processing task can use the copy of the second mapping to write the payload data of the first utility data object to elements of a predefined data structure instance.

BRIEF DESCRIPTION OF THE SEVERAL VIEWS OF THE DRAWINGS

The above and other items, features and advantages of the invention will be better understood by reading the following more particular description of embodiments of the invention in conjunction with the figures wherein.

DETAILED DESCRIPTION

Figure 1:
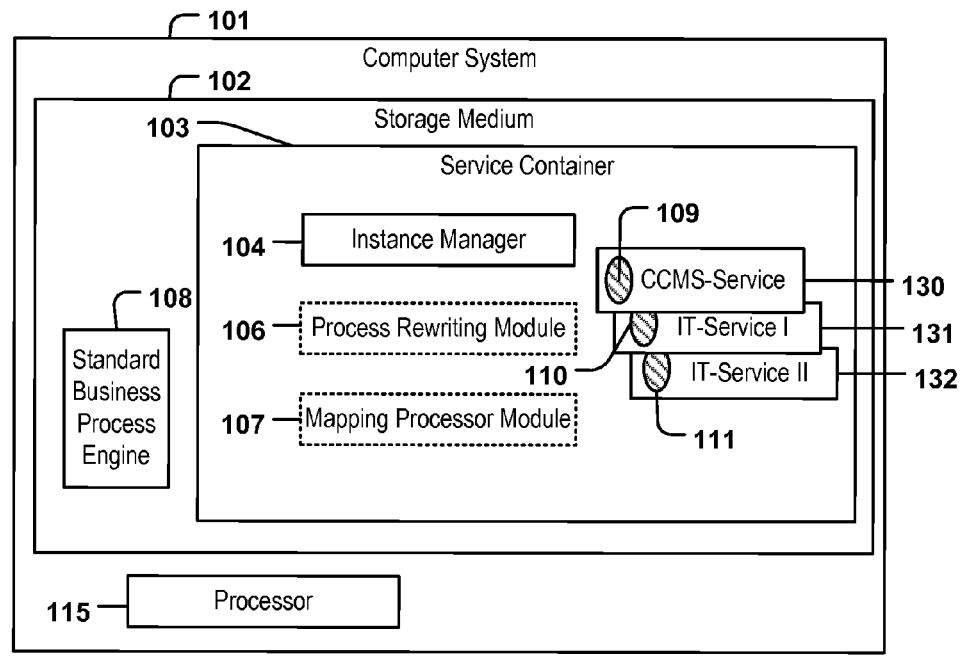
FIG. 1 is a block diagram of a computer system operating a service container and a standard business process engine.

Embodiments of the invention are described herein after by way of examples with reference to the accompanying figures and drawings.

One or more embodiments of the present invention relate to the field of computer implemented methods for executing a business process by a standard business process engine and, more particularly, to the field of exchanging data between the business process and an instance of an arbitrary data structure.

It is an objective of embodiments of the invention to provide for a computer-implemented method allowing data exchange between a business process executed by a standard business process engine and an instance of a data structure, whereby said data structure may be of an arbitrary format, including proprietary data structures which are per se not interpretable by said standard processing engine.

The term 'payload data' as used herein encompasses any kind of data that is to be exchanged at execution time of a business process between said business process and a predefined data structure instance. Said predefined data structure may be, e.g., a hierarchical data structure representing, e.g., a social network of users, or may be a data structure acting as an I/O interface of a service called by the business process. Exchanging data as used herein implies writing payload data being generated and/or used by the business process to elements of said predefined data structure instance. In addition, or alternatively, exchanging data as used herein can also imply reading or receiving payload data from said predefined data structure instance by the business process, said payload data having being generated and/or provided, e.g., by an external data resource of a service, by an instance of a data structure representing a social network, or the like.

The term 'business process engine' as used herein encompasses any type of asynchronous computer-implemented program being operable to execute a business process in accordance with a process definition and being operable to monitor the current state of executed business processes. Thereby, the term "business process" is to be understood in a very generic sense as any kind of process being executable by a business process engine, e.g., a process modelling a business workflow, but also computer-implemented representation of technical workflows, manufacturing workflows, sample handling workflows and the like. A 'process' thereby is a sequence of tasks, each task including a set of program instructions to be executed by a standard business process engine. Tasks which are already specified within the business process definition at deployment time of said business process definition are also referred to as 'original tasks'.

The term 'business process definition' as used herein is a specification of one or more tasks to be executed by a standard business process engine, whereby the business process definition is specified in a standard conform business process language. Typically, a business process definition is created by a business process engineer and deployed into a runtime environment (RE) of a standard business process engine, the RE automatically creating a corresponding business process according to the deployed business process definition.

The term 'standard business process engine' as used herein refers to a business process engine which completely relies on standard business process languages. Current standard business process languages are, for example, BPMN (Business Process Model and Notation) or BPEL (Business Process Execution Language).

A data structure is a way of representing data in a computer-interpretable form according to a particular structure. An instance of a data structure can include elements, e.g., attribute fields, according to said data structure, whereby each of said elements may have assigned a data value.

A 'context data object' is a data object which is used by a business process executed by a standard business process engine to store its context data. The term 'data object definition' as used herein encompasses any kind of computer-interpretable document specifying the structure of a data object and its corresponding data object instances. An example of a data object definition is a schema for a database table or an XML schema document. An XML schema is a description of a type of XML document, typically expressed in terms of constraints on the structure and content of documents of said type. The term 'standard data object definition' as used herein is a data object definition specified in accordance with a standard business process language such as, for example, BPMN or BPEL and being therefore processable by a standard business process engine.

The term 'service' as used herein encompasses any software system designed to support interoperable machine-to-machine interaction between two or more software and/or hardware modules, whereby the two or more interacting instances may be hosted on the same processing device or on two or more different processing devices connected via a network. A service may be any IT-Service, e.g., a Web-Service based on SOAP or other protocols. A service may also be provided by a change and configuration management system such as the Tivoli Change and Configuration Management Database which is operable to manage one or more cloud services. A cloud service is a collection of IT resources (e.g. servers, storage, network, software, etc.) provided to a customer over the internet. Typically, the operations performed by a change and configuration management system are based on a structural data model and a corresponding predefined data structure which can be used by a business process engine to exchange data with said configuration management system.

A 'predefined data structure definition' as used herein is a specification of the predefined data structure used by a service for exchanging data.

In one aspect, one or more embodiments of the invention relate to a computer-implemented method for executing a business process by a standard business process engine and for enabling the business process to exchange payload data with an instance of a predefined data structure, whereby the payload data must conform to a standard data object definition for being processable by the standard business process engine, whereby the standard data object definition does not include a specification of the predefined data structure, whereby an aspect of the computer-implemented method can include the steps of:

providing a context data object, the context data object including a payload data structure for storing the payload data,
whereby said context data object is annotated with a first mapping and/or a second mapping,
whereby the first mapping connects elements of the predefined data structure to elements of said payload data structure,
whereby the second mapping connects elements of said payload data structure to elements of said predefined data structure, and
whereby the annotated context data object does not conform to the standard data object definition,
automatically splitting said annotated context data object into one or more utility data objects, each utility data object conforming to said standard data object definition, the one or more utility data objects including:
a first utility data object including the payload data structure,
in case the context data object is annotated with the first mapping, a second utility data object, whereby said second utility data object includes a copy of the first mapping, and
in case the context data object is annotated with the second mapping, a third utility data object, whereby said third utility data object includes a copy of the second mapping,
in case the second utility data object is created, injecting into the business process a pre-processing task, the pre-processing task using the copy of the first mapping to read data from the predefined data structure instance and to store the read data as payload data in the payload data structure of the first utility data object,
in case the third utility data object is created, injecting into the business process a post-processing task, the post-processing task using the copy of the second mapping to write the payload data of the first utility data object to elements of the predefined data structure instance.

According to some embodiments, the context data object has assigned at least the first or the second mapping, and at least two utility data objects are created accordingly.

In one beneficial aspect, embodiments of the invention thereby provide for a mechanism enabling any standard business process engine, i.e., a business process engine using a standardized process language, to exchange data with an arbitrary (e.g., proprietary) predefined data structure instance of any arbitrary resource without having to adapt the standard business process engine and/or the standard business process language to said particular predefined data structure, although said predefined data structure does not conform to a standard business process modelling language. In a further aspect, said embodiments provide for an annotation method for annotating standard business process definitions with mapping information for enabling a standard business process engine to exchange data with any kind of predefined data structure instances.

In a further beneficial aspect, embodiments of the invention provide for a mechanism allowing the synchronization of standard business process definitions with a potentially complex predefined data structure instance without requiring a process modeller to acquire in depth knowledge of the respective data structure. Accordingly, embodiments of the invention provide for a mechanism allowing modellers of business plans to focus on process modelling, not on specifying special, platform-dependent tasks for exchanging data between the business process and the services addressed by said business process. For example, the first and second mappings allow for the automated creation of tasks enabling the data exchange with the predefined data structure instance, whereby said additional tasks can be executed by any standard business process engine. As a consequence, a once specified business process definition may be reused in a variety of different technical platforms.

According to embodiments, the first and/or second mappings are annotated by a user, e.g., a business process engineer, by means of a graphical tool, i.e., a software tool providing a graphical user interface which enables a user to specify the mappings. The user annotates a context data object with the first and/or second mapping. The annotated data objects are part of the process definition which is deployed into the RE business process engine after having finished annotating. During deployment, a pre-processing and/or a post-processing task are created in dependence on the presence and content of said first and/or second mapping (which determine the presence and content of the respective copies of the mappings) and are inserted into the business process definition of the business process. As a consequence, said first and/or second mappings provide at execution time of the standard business process engine all information necessary for exchanging payload data having been stored to the payload data structure of the annotated context data object with the predefined data structure instance.

Injecting a task into the business process may imply automatically adding or modifying tasks to be executed by the business process, whereby said added or modified tasks may be automatically adapted to the particular requirements of the RE within which the services are executed.

According to embodiments, the predefined data structure is a hierarchical data structure whose nodes respectively represent resources used by a cloud service.

According to embodiments, the predefined data structure instance is an instance of a schema. A schema as used herein is a specification of a data graph, e.g. an XML schema. Said schema can be specified, for example, according to the Document Type Definition (DTD) language. This is advantageous, because XML documents and XML schemas can be interpreted by a human reader as well as by a computer program easily.

According to embodiments, the predefined data structure acts as I/O interface of a service, whereby the predefined data structure instance is an instance of a schema, said schema being processable by the service. According to embodiments, said schema is an XML schema and can be specified, for example, according to the Document Type Definition (DTD) language. Said schema may also be specified in a non-XML based language such as OWL or RDF.

According to further embodiments, the step of injecting a task into the business process respectively includes inserting an additional task specification into a business process definition, the business process definition being a document including one or more task specifications, each task specification specifying a task to be executed by the standard business process engine when the business process is executed. According to embodiments, the business process definition is specified in BPMN and/or BPEL language. According to embodiments, the standard business process engine is a program or program module being operable to interpret and execute business processes only if said processes have been defined in BPMN and/or BPEL. Accordingly, the business process is an instance of a business process definition specified in BPMN and/or BPEL language.

According to embodiments, the payload data structure is an XML structure defined by an XML schema definition and the standard data object definition is specified according to the standard business process language being used. According to further embodiments, the payload data includes or represents process context data, whereby process context data includes any data which is used, received and/or returned by the business process during execution time for a particular business process instance.

According to embodiments, the computer-implemented method further includes the step of deploying a business process definition to a runtime environment within which said standard business process engine is executed, whereby the business process definition is a document including one or more task specifications. The injection of the pre-processing task and/or the post-processing task is executed during the deployment of the business process definition. These features are advantageous, because they allow to automatically add tasks to be executed by the standard business process engine by deploying the business process definition to the runtime environment of the business process. The automatically generated and/or injected tasks thereby comply with a standard business process language and can therefore be processed by said standard business process engine.

According to embodiments, the runtime-environment includes a process rewriting module, whereby the splitting of the annotated context data object and the injection of the pre-processing task and/or the post-processing task is executed by the process rewriting module, and whereby the process rewriting module is implemented as a separate module which is interoperable with the standard business process engine and which can be reversibly installed as a component of the runtime environment. A separate module of a RE is a component which adds additional functionality to said RE. If said separate module is not installed, the RE is still operable to execute some or most of its functions, but the RE may be operable to execute additional functions in case said component is installed. Said separate module may be implemented as plug-in of said RE or as program module being executable independently of the RE. Splitting the annotated context data object into utility data objects and injecting additional tasks in accordance with the generated utility data objects is advantageous, as the annotated context data object includes first and/or second mappings between elements of the payload data structure and the predefined data structure and vice versa and does therefore not conform to the standard business languages BPMN or BPEL. The context data object can therefore not be processed by a standard business process engine. The utility data objects, to the contrary, can be generated by the process rewriting module in accordance with the standard business process languages, thereby allowing a standard business process engine being executed in a particular proprietary runtime environment to exchange data with any (proprietary) predefined data structure.

According to embodiments, the process rewriting module is implemented as a module which is interoperable with the standard business process engine and which can be reversibly installed and deinstalled as an independent component of the runtime environment.

This is advantageous, because the splitting and injecting steps are executed by one single module which can be implemented e.g. as a plug-in of the runtime environment or as any other independently maintainable piece of program logic which is interoperable with said runtime environment. Depending on the embodiment, the process rewriting module can be implemented in a multitude of different variants, each variant being particularly adapted for one particular, e.g. proprietary runtime environment. Thereby each proprietary runtime environment is enabled to host proprietary services which use proprietary predefined data structures as I/O interfaces for exchanging data with a standard business process. As a consequence, a process modeller does not have to develop different business process definitions for each particular proprietary runtime environment. He rather can specify one single business process definition which can be deployed to a variety of proprietary runtime environments. Provided that each proprietary runtime environment has installed a corresponding variant of the process rewriting module, the business process deployed to each particular runtime environment is operable to exchange payload data with the predefined (proprietary) data structure of said runtime environment, because tasks which provide for the data exchange functionality are automatically created by said process rewriting module when deploying the business process definition.

According to embodiments, the pre-processing task and/or the post-processing task are created automatically by the process rewriting module during the deployment of the business process definition into the runtime environment by analyzing the business process definition.

The term 'service container' as used herein encompasses any runtime environment within which one or more IT-services and/or a change and configuration management system are run. The service container provides for services to be accessed by a standard business process engine. A service container may be, for instance, an IBM WebSphere e-business platform running a change and configuration management service, e.g., IBM Tivoli. Alternatively or in addition, the services run by said service container can be, for example, IT-services such as conventional Web-services. According to embodiments, a service container provides an interface for deploying a business process definition into said service container. During deployment of said business process definition, the service container may modify the business process definition such the business process being executed by the standard business process engine can exchange payload data with the predefined data structure instance of a service provided by said service container.

According to embodiments, the business process can include a plurality of first tasks and the computer-implemented method further can include steps to be executed by the process rewriting module. Said further steps can include: automatically determining at least one of the plurality of first tasks having assigned the context data object, using the at least one determined first task as the original task for processing the payload data, and creating the pre-processing task and/or the post-processing task in dependence on the presence of the first and/or second mapping in the assigned context data object.

This is advantageous, because these embodiments allow interchanging data with the predefined data structure instance without having specified the corresponding tasks in the business process definition in advance. For example, the process rewriting module may analyze the instructions and/or payload data being contained in the determined at least one first task and create the pre-processing and/or cost-processing task in dependence on a result of said analysis.

According to embodiments, the context data object is assigned to a task, i.e., the original task, manually by a user when specifying the tasks of the business process definition before deploying said business process definition into the RE. According to further embodiments, BPMN tools are used which analyze schemas of services to be associated with a business process definition, automatically create one or more context data objects based on the result of said analysis, and display said context data objects via a GUI to a user for assigning said context data objects to tasks specified in the business process definition. For example, all signatures (i.e., input, output or fault parameters) of all tasks specified in the business process definition may be detected automatically by analyzing the business process definition and a corresponding context data object can be automatically created. A user may then assign the first and/or second mapping to said automatically created context data objects.

According to embodiments, the runtime environment can include a mapping processor module for exchanging the payload data between said runtime environment and the standard business process engine during execution time of the business process, whereby the mapping processor module reads the payload data from the predefined data structure by executing the steps of:
- analyzing the copy of the first mapping,
- reading the payload data from the predefined data structure instance, and
- writing the read payload data into the payload data structure of the first utility data object according to said analyzed copy of the first mapping,
- whereby the mapping processor module writes payload data of the payload data structure to the predefined data structure by executing the steps of:
- analyzing the copy of the second mapping,
- reading the payload data from the payload data structure of the first utility data object, and
- writing the read payload data into the predefined data structure instance according to the said analyzed copy of the second mapping.

Executing the reading and/or writing operation according to the analyzed mapping is advantageous, because all information required for exchanging the payload data between the business process and the predefined data structure is encapsulated in the first and/or second mapping which does not include any platform-dependent data, i.e., data depending on the type of runtime environment used for operating the business process and the services. The first and second mappings are abstractions from a particular programming language, a particular business process description language or a particular predefined data structure, thereby allowing to separate the task of specifying a business process definition/executing a corresponding business process from the task of exchanging payload data at runtime of said business process between said business process and the predefined data structure instance.

According to embodiments, the mapping processor module can be implemented as a separate module which is interoperable with the standard business process engine and which can be reversibly installed as a component of the runtime environment. If said separate module is not installed, the runtime environment is still operable to execute some or most of its functions, but the RE may be operable to execute additional functions in case said component is installed. Said separate module may be implemented as plug-in of said RE or as program module being executable independently of the RE. This is advantageous, because the step of reading and/or writing data from and/or to the predefined data structure instance may encompass additional processing steps being particularly to the runtime environment used. The reading and/or writing of payload data by a separate hardware and/or software module allows implementing said reading and/or writing operations in a way conforming to the structure of any proprietary predefined data structure and/or in a way conforming to the requirements of any proprietary service container. By providing an individually installable and/or de-installable mapping processor module being responsible for actually executing the reading and/or writing operations, it is possible to adapt set operations to the particular needs of each service container.

According to embodiments, the main function of the process rewriting module is to create additional tasks when the context data object is deployed in dependence on the annotated mappings, and to inject said task into the business process, and to create utility data objects which can be used at execution time of the business process by the mapping processor module. According to embodiments, the main function of the mapping processor module is to conduct the data exchange based on said utility data objects at execution time of the business process.

According to embodiments, the first mapping maps one or more elements of the predefined data structure to one or more elements of the context data object, i.e., is an n:m mapping. This is advantageous, as it allows reading data from a plurality of elements of said predefined data structure instance.

According to embodiments, the second mapping maps one or more elements of the context data object to one or more elements of the predefined data structure, i.e., is an n:m mapping. This is advantageous, as it allows writing data from one single element of the payload data structure to a plurality of elements of said predefined data structure instance.

According to further embodiments, the computer-implemented method further can include steps to be executed automatically at execution time of the business process. Said further steps can include:
- creating, for the original task, a first compensation task, the first compensation task in operation undoing all effects of the original task,
- in case the pre-processing task was created, creating a second compensation task, the second compensation task in operation undoing all effects of the pre-processing task, and
- in case the post-processing task was created, creating a third compensation task, the compensation post-processing task in operation undoing all effects of the post-processing task,
- whereby each of the compensation tasks is executed by the standard business process engine in case the corresponding original, pre-processing and/or post-processing tasks was not executed correctly.

For example, if during the execution of the pre-processing task an exception is thrown due to an error, the corresponding second compensation task is executed which reverses all changes introduced by the pre-processing task. Said features are advantageous, because they allow implementing an automated failure prevention and recovery functionality which may include also complex instructions going beyond typical failure recovery strategies based on throwing exceptions.

According to embodiments, the method further can include the step of automatically, at execution time of the business process, injecting one or more maintenance tasks into the business process, each maintenance task assisting in the maintenance of one or more IT services.

According to some embodiments, said compensation tasks and/or maintenance tasks are created and injected by the process rewriting module. This is advantageous, because the error recovery functionality provided by said module and also the maintenance functionality can be adapted to the requirements of each particular (potentially proprietary) runtime environment.

According to some embodiments, the first and/or second mapping are specified by means of a graphical user interface (GUI), whereby the computer-implemented method further includes the steps of receiving the business process definition, the business process definition including a specification of the predefined data structure; displaying, on said GUI, elements of the predefined data structure as first elements; receiving the payload data structure; and displaying, on said GUI, elements of the payload data structure as second elements, whereby the GUI provides a user with drag & drop functionality for connecting one or more of the first elements with one or more of the second elements, thereby mapping the connected first and second elements to each other.

According to embodiments, the first and the second mappings can be specified via an extension to the BPMN 2.0 language. The first mapping specifies how to read payload data from the predefined data structure by the standard business process and how to materialize the read values and assign them to elements of the payload data structure for further processing.

According to embodiments, the binding between the payload data structure and a particular business process can be established by creating, within the business process definition of said process, an assignment between a task specification of an original task of said business process and a particular context data structure.

The binding between the predefined data structure and a particular business process can be established by creating, within the business process definition of said process, an assignment between said business process and a particular service, the service being accessible via an instance of the predefined data structure.

According to embodiments, the second mapping can specify how to write payload data stored to the payload data structure of the first utility data object into the instance of the predefined data structure. In other words, the second mapping specifies how to write payload data being created or provided by a task of a standard business process into an instance of the predefined data structure.

Depending on each particular original task, only the first, only the second or both the first and the second mapping may be used for exchanging payload data between the standard business process and the instance of the predefined data structure. To achieve this, elements of the predefined data structure and elements of a schema specifying the structure of the payload data are mapped to each other. An 'element' thereby can be, for example, an element of an XML document, including also XML attributes of XML elements. The structure of said XML based payload data structure may be specified in an XML schema document.

In a further aspect, one or more embodiments of the invention relate to a computer system including a processor and a non-transitory storage medium, whereby the non-transitory storage medium includes machine executable instructions for execution by the processor. Executing the instructions causes the processor to execute the steps of any one of the above embodiments of the computer implemented method.

As will be appreciated by one skilled in the art, the features of the above mentioned embodiments can be combined with each other. For example, a service container may include a process rewriting module and a mapping processor module according to embodiments of the invention, whereby both modules are respectively implemented as individually installable plug-ins of the service container.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to embodiments of the invention depicted in the figures. It will be understood that the block of the diagrams depicting as service container, as standard business process engine or other modules can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in said blocks of the diagrams. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in said blocks.

FIG. 1 depicts a computer system 101 including a computer readable, non-transitory storage medium 102 and a processor 115. The processor, when executing instructions stored in the storage medium, operates a standard business process engine 108 and a service container 103. The service container includes several functional modules, e.g., an instance manager 104 and a mapping processor module 107 whereby the particular composition of modules may depend on the particular service container installation and the service container type. The instance manager module 104 is responsible for instantiating predefined data structures based on predefined data structure definitions, thereby creating one or more predefined data structure instances 109-111. Each predefined data structure definition may specify which data elements (e.g., information about IT resources, users, accounts and the like) will be used by a particular service and may also specify how said data elements are related to each other, i.e., which kind of data generated by a first object (IT resource, user, account . . . ) is related to a second object (IT resource, user, account . . . ) for further processing. Said predefined data structure definition may also be a schema of a predefined data structure. The predefined data structure instances 109-111 may act as I/O interfaces of one or more services 130-132 provided by said service container.

The service container further includes a process of rewriting module 106 which is operable to process a non-standard business process language conform context data object, split said object into standard business process language conform utility data objects and create additional tasks based on said utility data objects. The process of creating tasks and injecting tasks into a standard business process is depicted in greater detail in FIG. 3.

The service container 103 further includes a mapping processor module 107 for analyzing first and second mappings for exchanging payload data between a business process executed by the standard business process engine 108 and a predefined data structure instance 109 acting as I/O interface of a service 130. The details of a reading operation performed by said mapping processor module 107 are depicted in greater detail in FIG. 4. The details of a writing operation performed by said mapping processor module are depicted in greater detail in FIG. 5. The mapping processor module as well as the process rewriting module may be an integral part of the service container 103. According to some embodiments, however, said modules are implemented as software modules which are adapted to a particular service container and which can be installed as additional components, e.g., as plug-ins, of each software container as needed. Therefore, said two modules 106 and 107 are depicted with dotted borders.

Figure 2:
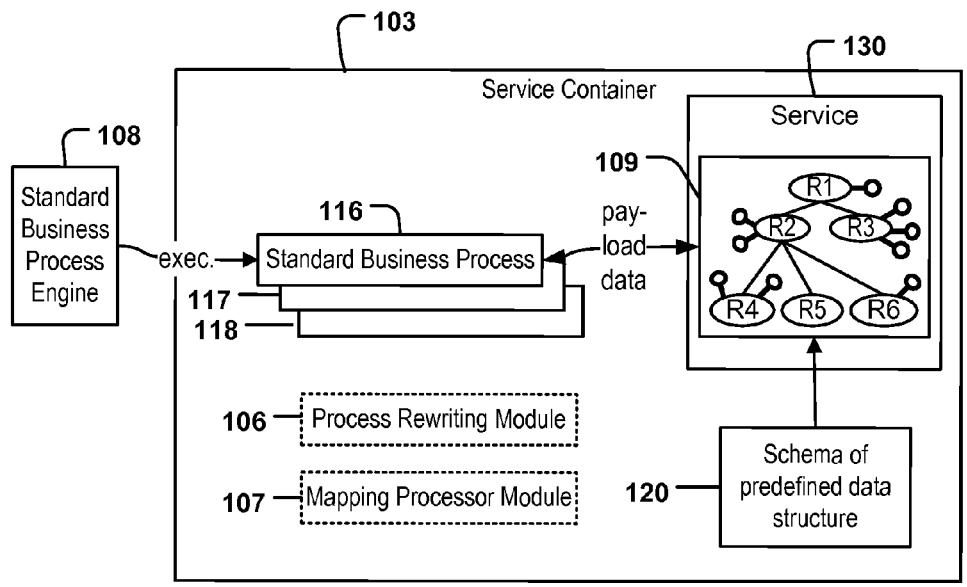
FIG. 2 depicts some elements of the service container in greater detail.

FIG. 2 depicts the service container 103 and service 130 in greater detail. The standard business process engine 108 runs one or more standard business processes 116-118. The service container operates service 130 which is being accessible via a predefined data structure instance 109. The service 130 uses an instance 109 of the predefined data structure for receiving payload data from one 116 of the standard business processes 116-118 and/or for providing payload data to said standard business process. The structure and composition of the predefined data structure instance 109 is specified by a schema 120. The elements of said schema 120 (and, accordingly, the elements of the corresponding predefined data structure instance 109) are depicted in FIG. 2 as black circles with a handle having a white interior area. Said elements can be, for example XML elements, XML attributes or the like. According to other implementations, said schema is an RDF schema and the elements RDF elements. According to some embodiments, each executed standard business process 116-118 is instantiated automatically by the standard business process engine 108 based on a business process definition document.

Figure 3:
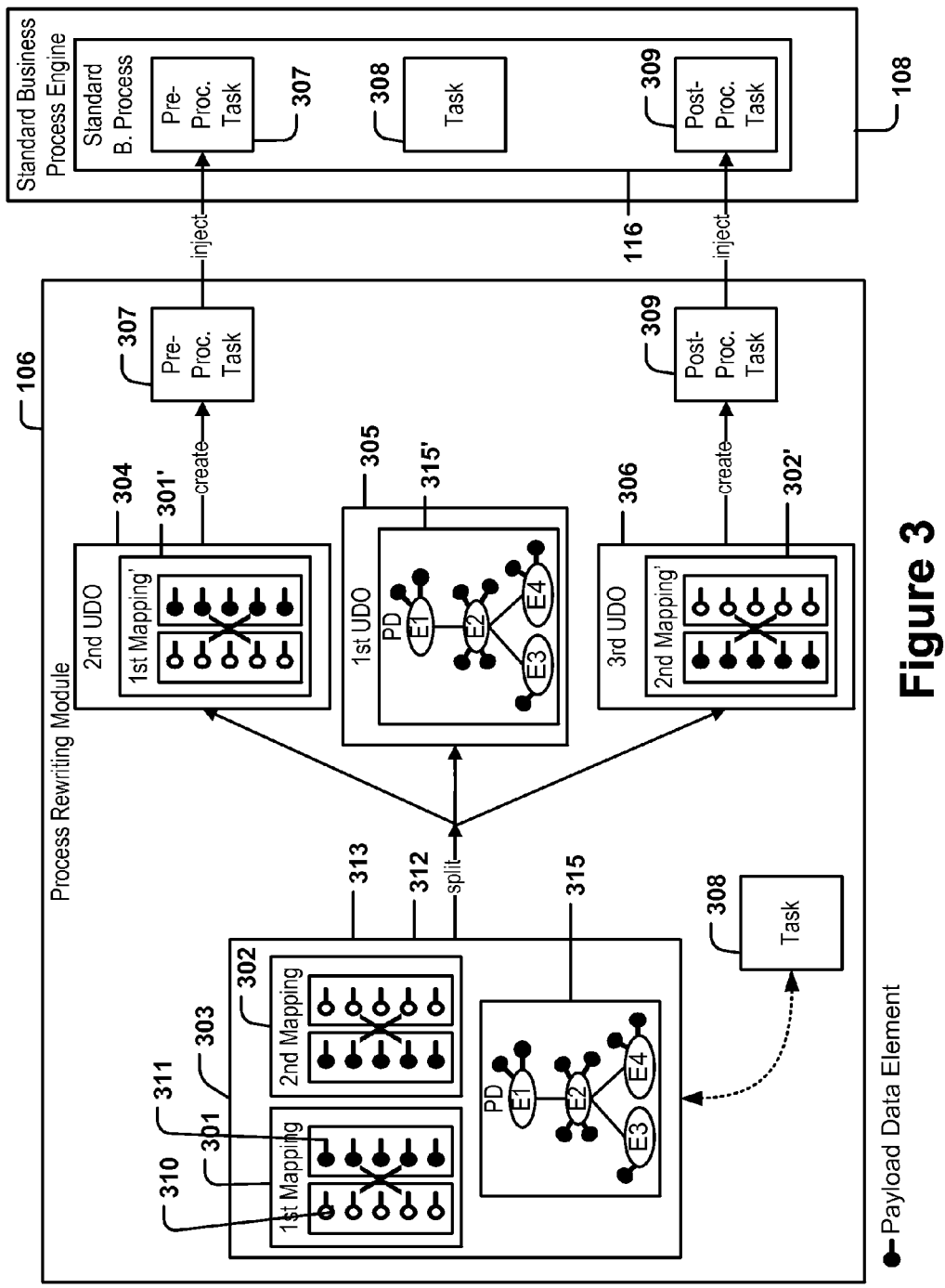
FIG. 3 illustrates the process of splitting an annotated context data object into three utility data objects and injecting three tasks being based on said three utility data objects.

FIG. 3 depicts the process rewriting module 106 and data structures processed and/or created by said module in greater detail. The process rewriting module 106 receives a context data object 303 which includes a payload data structure 315. According to embodiments, said payload data structure is specified by a payload data schema. Some of the elements of said payload data structure may have assigned a data value. The elements of said payload data structure 315 are depicted in FIG. 3 as black circles with a handle having a black interior area. Depending on whether the context data object 303 or its derivative utility data objects 304-306 are used for executing a read and/or write operation on the predefined data structure instance, data values assigned to elements of the payload data structure 315 may be read and/or overwritten. It is also possible that no value is assigned to one or more elements of the payload data structure 315 and that said payload data structure is merely used as a container for receiving data from the predefined data structure instance.

Context data object 303 is annotated with a first mapping 301 and/or a second mapping 302. The first mapping connects elements of the predefined data structure to elements of said payload data structure and the second mapping connects elements of said payload data structure to elements of said predefined data structure.

According to some embodiments, the schema of the payload data structure is referenced in the context data object via a particular element of the payload data, the itemSubjectRef attribute.

The second utility data object is only created if the context data object 303 was annotated with a first mapping. The second utility data object includes a copy of the first mapping, whereby the elements of the predefined data structure are mapped to elements of the payload data structure.

The third utility data object 306 is only created if the context data object was annotated with a second mapping. The third utility data object includes a copy 302' of the second mapping, whereby the elements of the payload data structure of the payload data structure are mapped to elements of the predefined data structure.

The process rewriting module automatically splits the annotated context data object 303 into utility data objects 304-306, whereby each utility data object conforms to said standard data object definition. The first utility data object 305 includes the payload data structure 315. In case the context data object was annotated with the first mapping 301, a second utility data object 304 is automatically created. Said second utility data object 304 includes a copy of the first mapping, referred in FIG. 3 as first mapping' 301'. First mapping 301' maps elements of the predefined data structure to elements of the payload data structure of the first utility data object. In other words, said first mapping' includes an identifier of the first utility data object for referencing payload data elements of the payload data structure of said first utility data object.

An example of a copy 301' of the first mapping being contained in the second utility data object 304 is given in the following. Based on the copy 301' of the first mapping, a value assigned to the MemorySize element of the DB2 element of the schema 120 of the predefined data structure instance 109 can be copied to the reqBuffer element of the first utility data object "305_DO". Similarly, the value assigned to the WasServerName element of the WAS element of the schema of the predefined data structure will be read and copied to the serverName element of the payload data contained in the 305_DO utility data object:

```
<dataObject id="315_DO "
name="315_DO" itemSubjectRef="315_DODefinition">
<sdnp:TopologyMappingDefinition>
<sdnp:TopologyReadMappings>
<sdnp:TopologyReadMapping>
<sdnp:NodeReference nodeReference="DB2"/>
<sdnp:ParameterMapping nodePropertyReference="//MemorySize"
parameterReference="//reqBuffer"/>
</sdnp:TopologyReadMapping>
<sdnp:TopologyReadMapping>
<sdnp:NodeReference nodeReference="WAS"/>
<sdnp:ParameterMapping nodePropertyReference="//WasServerName"
parameterReference="//serverName"/>
</sdnp:TopologyReadMapping>
</sdnp:TopologyReadMappings>
</sdnp:TopologyMappingDefinition>
</dataObject>
```

The TopologyReadMapping element may contain multiple ParameterMapping elements for the same NodeReference element instance. This implies that one TopologyReadMapping element can map multiple elements of the predefined data structure to one particular element of the payload data structure. As a result, the payload data structure of the context data object can be filled with data values having been derived from a plurality of predefined data structures.

The third utility data object 306 includes a copy of the second mapping, referred in FIG. 3 as copy 302' of the second mapping. An example of a copy 302' of the second mapping being contained in the third utility data object 306 is given in the following. The value assigned to the volatileMemory element of the payload data structure 315 contained in the first utility data object "305_DO" is written into the memorySize element of the WAS element of the predefined data structure instance.

```
<dataObject id="315_DO"
name="315_DO" itemSubjectRef="315_DODefinition">
<sdnp:TopologyMappingDefinition>
<sdnp:TopologyWriteMappings>
<sdnp:TopologyWriteMapping>
<sdnp:NodeReference nodeReference="WAS"/>
<sdnp:ParameterMapping nodePropertyReference="//MemorySize"
parameterReference="//volatileMemory"/>
<sdnp:ParameterMapping nodePropertyReference="//WasServerName"
parameterReference="//serverName"/>
</sdnp:TopologyWriteMapping>
</sdnp:TopologyWriteMappings>
</sdnp:TopologyMappingDefinition>
</dataObject>
```

According to the depicted embodiment, the process rewriting module 106 determines all tasks of a currently executed standard business process which exchange data with a predefined data structure instance. One of those tasks 308 is depicted in FIG. 3. Task 308 has assigned a context data object 303 as indicated by the dotted double-arrow. Said task is also referred to as 'original task'. Depending on whether the assigned context data object 303 is annotated with a first and/or a second mapping, said task 308, also referred to as 'original task', is bracketed by a pre-processing task and/or a post processing task by automatically executing the following steps: the context data object 303 is split it into a first utility data object 305, a second utility data object 304 and/or a third utility data object 306. The first utility data object includes a copy 315' of the payload data structure 315 of the context data object. The order in which the nodePropertyReference attribute and the parameter reference attribute of the ParameterMapping element are considered is different in the first mappings and second mappings.

The process rewriting module 106 further executes the step of injecting into the business process a pre- and/or post-processing task. The original task for processing the payload data of the first utility data object is already part of the business process definition created by the process modeler (e.g., process engineer) when the business process definition is deployed and a corresponding business process is instantiated.

In case the second utility data object was created, a pre-processing task 307 is created and injected into the standard business process 116. Said pre-processing task can be used for reading data values from the predefined data structure instance and for writing said read data values into elements of the payload data of the first utility data object according to the first mapping'. As the task 308 can access the payload data structure of the first utility data object, the data read by the pre-processing task is the input for the original task.

In case the third utility data object was created, the process rewriting module 106 creates a post-processing task 309 and injects said post-processing task into the standard business process 116. Said post-processing task can be used for writing data values being contained in the payload data structure of the first utility data object into elements of the predefined data structure instance according to the copy 302' of the second mapping.

For instance, first and the second mapping may be implemented as a mapping of XPath expression, whereby a first XPath expression is specified for matching one or more elements of the payload data structure 315 and a second XPath element is specified for matching one or more elements of the predefined data structure instance 109. The mapping processor module, upon receiving the first 305 and the second 304 utility data objects as input uses the first mapping 301' of the second utility data object to match the first and second XPath expressions against the payload data structure 315' and the predefined data structure instance 109, thereby copying the data of elements of the predefined data structure instance to matching elements of the payload data structure 315' in accordance with the first mapping 301'.

Upon receiving the first 305 and the third 306 utility data objects as input, the mapping processor module uses the second mapping 302' of the third utility data object to match the first and second XPath expressions against the payload data structure 315' and the predefined data structure instance 109, thereby copying the data of elements of the payload data structure 315' to matching elements of predefined data structure in accordance with the first mapping 301'.

As a standard business process engine is not operable to process the context data object including the first and second mapping. Splitting said context data object into utility data objects respectively conforming to a standard business process language thus allows the standard business process engine to exchange payload data with a predefined data structure instance of an arbitrary (proprietary) format.

Figure 4:
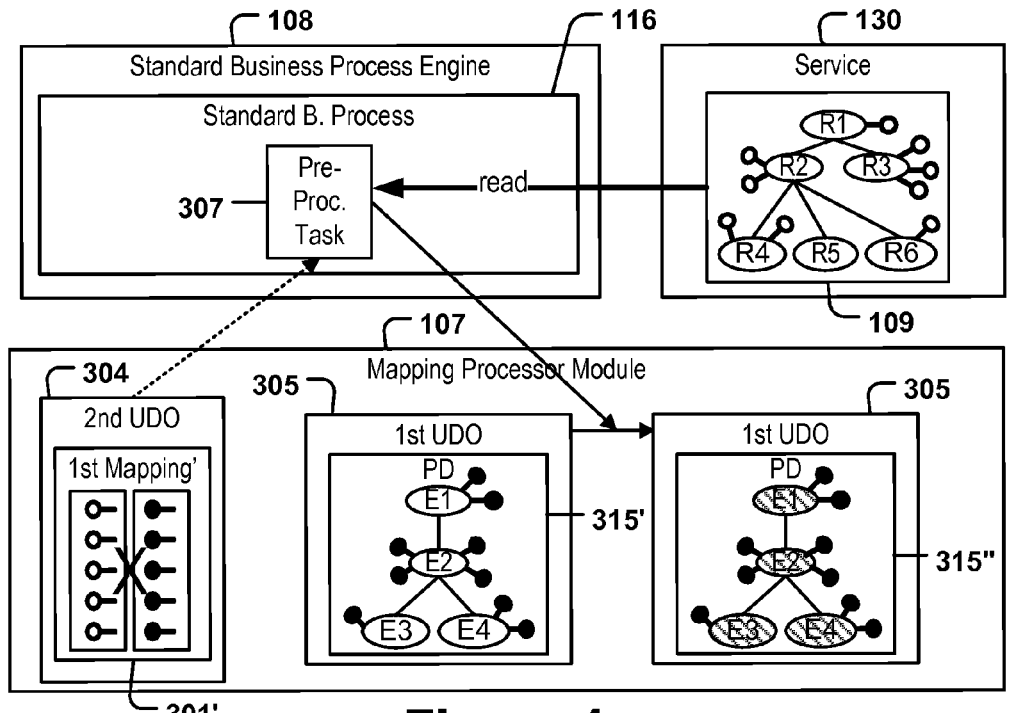
FIG. 4 depicts the process of reading payload data from a predefined data structure instance.
Figure 5:
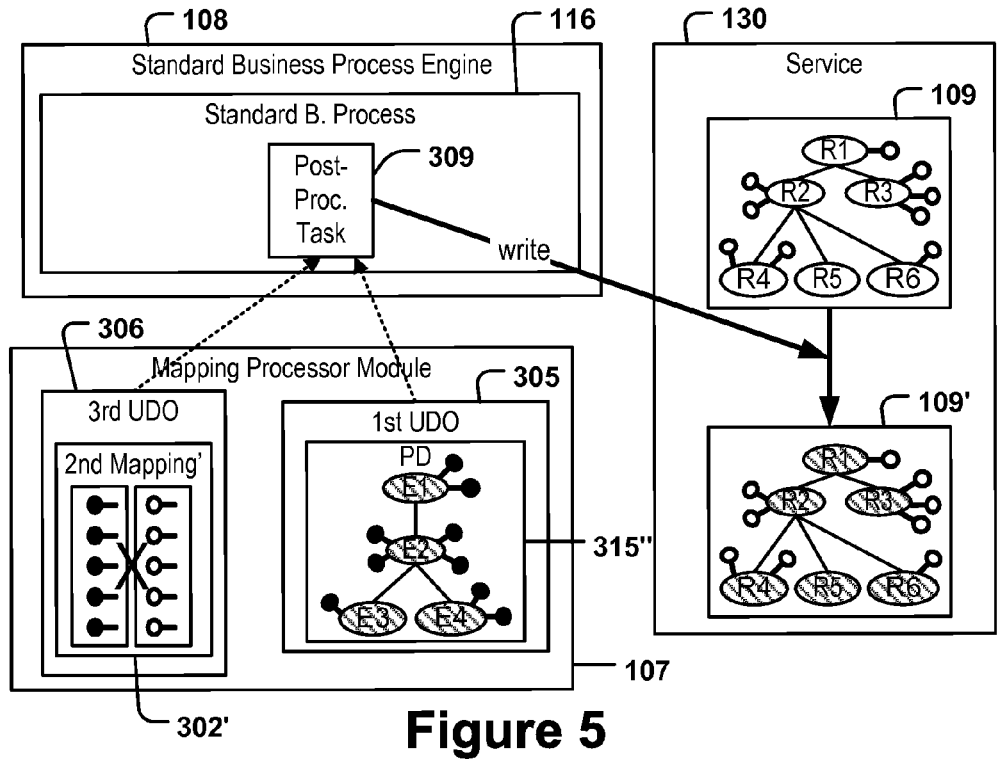
FIG. 5 depicts the process of writing payload data into said predefined data structure instance.

The standard business process engine 108 runs a standard business process 116 which includes, as a result of the injections step, a preprocessing task 307 and a post-processing task 309. The task 308, also referred to as 'original task', is not created by the process rewriting module as the task specification of the original task is already part of the deployed process definition. FIGS. 4 and 5 in the following depict in greater detail how said preprocessing task 307, the original task 308 and the post-processing task 309 are respectively handled by the business process engine according to embodiments of the invention.

FIG. 4 depicts the process of reading payload data from a predefined data structure instance. Said pre-processing task 307 of task 308 accesses an interface (e.g., a proprietary interface) of the service container 103 for reading payload data from the predefined data structure instance 109. Said predefined data structure instance 109 acts as I/O interface of a service 130. Data values being assigned to elements of the predefined data structure instance are read by the mapping processor module 107 and are assigned and written into elements of the payload data structure 315' of the first utility data object according to the copy 301' of the first mapping of the second utility data object 304. The modification of the data values assigned to elements of the payload data of the first utility data object is depicted in FIG. 4 by the hachure of nodes of the payload data structure 315" of the first utility data object 305. Accordingly, the first and the second utility data objects 304, 305 are required as input for executing a reading operation, whereby the data content of the payload data structure of the first utility data object may be modified as a result of the reading operation, as is expressed by the reference numbers 315'→315".

The modified first utility data object 305 can be used as input of the original task 308, whereby the original task may execute further processing steps on the payload data structure 315", thereby generating a result which needs to be written back into a predefined data structure instance 109. Depending on the implementation, said result may be written into the predefined data structure instance of the same or another service or of any other data structure of an external middleware component. The writing process is depicted in greater detail in FIG. 5.

FIG. 5 depicts the process of writing payload data into said predefined data structure instance 109. Task 308 produces output which shall be stored into the predefined data structure instance by using an interface of the service container, whereby said interface may be a proprietary interface. Writing said data through the proprietary interface by the standard business process engine 108 is accomplished by means of the post-processing task 309. The mapping processor module 107 uses the copy 302' of the second mapping of the third utility data object 306 for mapping elements of the payload data structure 315" of the first utility data object 305 to elements of the predefined data structure instance 109. As a result, data values assigned to elements of said predefined data structure instance 109 may be overwritten, thereby creating an updated version 109' of the predefined data structure instance (indicated in FIG. 5 by the hachure). As a result, service 130 has received via its predefined data structure instance 109 the output having been generated by task 308 via its proprietary interface, although said task 308 was executed by a standard business process engine being not operable to interpret said proprietary interface used by service 130.

What is claimed is:

1. A method of executing a business process by a standard business process engine, the method comprising:
providing a context data object annotated with mapping information, the context data object including a payload data structure for storing a payload data;
automatically splitting said annotated context data object using a processor into one or more utility data objects, each utility data object conforming to a standard data object definition, the one or more utility data objects including:
a first utility data object comprising the payload data structure;
a second utility data object when the context data object is annotated with a first mapping, wherein said second utility data object comprises a copy of the first mapping; and
a third utility data object when the context data object is annotated with a second mapping, wherein said third utility data object comprises a copy of the second mapping;
responsive to creating the second utility data object, injecting into a business process a pre-processing task, the pre-processing task using the copy of the first mapping to read data from the predefined data structure instance and to store the read data as payload data in the payload data structure of the first utility data object; and
responsive to creating the third utility object, injecting into the business process a post-processing task, the post-processing task using the copy of the second mapping to write the payload data of the first utility data object to elements of a predefined data structure instance.

2. The method of claim 1, wherein the payload data conforms to a standard data object definition for being processable by the standard business process engine; and
wherein the standard data object definition does not comprise a specification of the predefined data structure.

3. The method of claim 1, wherein said context data object is annotated with the first mapping and the second mapping;
wherein the first mapping connects elements of the predefined data structure to elements of said payload data structure;
wherein the second mapping connects elements of said payload data structure to elements of said predefined data structure; and
wherein the annotated context data object does not conform to the standard data object definition.

4. The method of claim 1, wherein the predefined data structure instance is an instance of a schema.

5. The method of claim 1, wherein the predefined data structure instance acts as I/O interface of a service and wherein the predefined data structure is an instance of a schema, said schema being processable by the service.

6. The method of claim 1, wherein the payload data structure is an XML data structure and wherein the standard data object definition is an XML schema.

7. The method of claim 1, wherein the standard business process engine is a program operable to interpret and execute only business processes having been defined in BPMN and/or BPEL.

8. The method of claim 1, further comprising deploying a business process definition to a runtime environment within which the business process is executed, the business process definition being a document comprising one or more task specifications, each task specification specifying a task to be executed by the standard business process engine when executing the business process, wherein the injection of the pre-processing task and/or the post-processing task is executed during the deployment of the business process definition.

9. The method of claim 8, wherein injecting a pre-processing or a post-processing task into the business process respectively comprises inserting an additional task specification into the business process definition.

10. The method of claim 8, wherein the runtime-environment comprises a process rewriting module, wherein the splitting of the annotated context data object and the injection of the pre-processing task or the post-processing task is executed by the process rewriting module, and wherein the process rewriting module is implemented as a separate module which is interoperable with the standard business process engine and which can be reversibly installed as a component of the runtime environment.

11. The method of claim 8, wherein the pre-processing task or the post-processing task are created automatically by the process rewriting module during the deployment of the business process definition into the runtime environment by analyzing the business process definition.

12. The method of claim 8, wherein the runtime environment is a service container.

13. The method of claim 8, wherein the business process comprises a plurality of first tasks, the computer-implemented method further comprising steps to be executed by the process rewriting module, said steps comprising:
- automatically determining at least one of the plurality of first tasks having assigned the context data object;
- using the at least one determined first task as the original task for processing the payload data; and
- creating the pre-processing task or the post-processing task in dependence on the presence of the first or second mapping in the assigned context data object.

14. The method of claim 8, wherein the runtime environment comprises a mapping processor module for exchanging the payload data between said runtime environment and the standard business process engine during execution time of the business process and wherein the mapping processor module reads the payload data from the predefined data structure by:
- analyzing the copy of the first mapping;
- reading the payload data from the predefined data structure instance; and
- writing the read payload data into the payload data structure of the first utility data object according to said analyzed copy of the first mapping.

15. The method of claim 14, wherein the mapping processor module writes payload data of the payload data structure to the predefined data structure by:
- analyzing the copy of the second mapping;
- reading the payload data from the payload data structure of the first utility data object; and
- writing the read payload data into the predefined data structure instance according to the said analyzed copy of the second mapping.

* * * * *